US012424799B2

(12) United States Patent
Yang et al.

(10) Patent No.: US 12,424,799 B2
(45) Date of Patent: Sep. 23, 2025

(54) PIN-SHORT DAMAGE PROTECTION

(71) Applicant: Microsoft Technology Licensing, LLC, Redmond, WA (US)

(72) Inventors: Wei Yang, Jiangsu (CN); Yanli Liu, Jiangsu (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 18/259,851

(22) PCT Filed: Jan. 12, 2021

(86) PCT No.: PCT/CN2021/071189
§ 371 (c)(1),
(2) Date: Jun. 29, 2023

(87) PCT Pub. No.: WO2022/150945
PCT Pub. Date: Jul. 21, 2022

(65) Prior Publication Data
US 2024/0079831 A1    Mar. 7, 2024

(51) Int. Cl.
*H01R 13/66* (2006.01)
*G05F 1/46* (2006.01)
*H02J 7/00* (2006.01)

(52) U.S. Cl.
CPC ........... *H01R 13/6683* (2013.01); *G05F 1/46* (2013.01); *H02J 7/0036* (2013.01)

(58) Field of Classification Search
CPC .............. H01R 13/6683; H01R 13/665; H01R 2201/04; G05F 1/46; H02J 7/0036; H02J 7/0029

(Continued)

(56) References Cited

U.S. PATENT DOCUMENTS 8,827,513 B2    9/2014 Chen et al.
9,563,244 B2 *  2/2017 Stevens ................... G06F 1/266
(Continued)

FOREIGN PATENT DOCUMENTS

AU    2013200705 A1    11/2013
CN       1542596 A     11/2004
(Continued)

OTHER PUBLICATIONS

"How to avoid Short-to-Vbus with the USB Type-C TPD6S300A", Retrieved From: https://www.ti.com/video/6005259744001, Feb. 21, 2019, 2 Pages.
(Continued)

*Primary Examiner* — Richard Tan
(74) *Attorney, Agent, or Firm* — Holzer Patel Drennan

(57) ABSTRACT

An electrical cable protects against pin-short damage at a connector port. The electrical cable includes one or more sensors positioned within the connector outer body that are configured to monitor a state of the connection interface of the electrical cable. The connection interface is configured to connect to and deliver power via the connector power between a power delivery source and a power delivery sink port. A power control signal controller is configured to predict a disconnection event between the connection interface of the electrical cable and the connector port based on the monitored state of the connection interface and to trigger a reduction in voltage supplied to a voltage bus of the electrical cable by the power delivery source, based at least in part on prediction of the disconnection event.

17 Claims, 4 Drawing Sheets

(58) Field of Classification Search
USPC .......................................................... 307/149
See application file for complete search history.

(56) References Cited

U.S. PATENT DOCUMENTS

| | | | |
|---|---|---|---|
| 9,716,350 | B2 | 7/2017 | Taniguchi et al. |
| 2014/0191588 | A1 | 7/2014 | Stevens |
| 2015/0180221 | A1 | 6/2015 | Inha et al. |
| 2015/0277527 | A1 | 10/2015 | Liu |
| 2019/0181590 | A1 | 6/2019 | Bae |
| 2020/0174625 | A1 | 6/2020 | Lin et al. |

FOREIGN PATENT DOCUMENTS

| | | |
|---|---|---|
| CN | 103218054 A | 7/2013 |
| CN | 105975039 A | 9/2016 |
| CN | 109326929 A | 2/2019 |
| CN | 110046117 A | 7/2019 |
| CN | 110854805 A | 2/2020 |
| CN | 211605566 U | 9/2020 |
| EP | 2219135 A1 | 8/2010 |

OTHER PUBLICATIONS

"Lego Mindstroms", Retrieved From: https://web.archive.org/web/20200428022334/https:/www.lego.com/cdn/cs/set/assets/bltbef4d6ce0f40363c/LMSUser_Guide_LEGO_MINDSTORMS_EV3_11_Tablet_ENUS.pdf, Apr. 28, 2020, pp. 1-69.

Pichot, Philippe, "Protecting Low-Voltage Systems or Sensors Against Short Circuits", Retrieved From: https://www.electronicdesign.com/technologies/power/article/21191381/protecting-lowvoltage-systems-or-sensors-against-short-circuits, Sep. 1, 2009, 6 Pages.

"Universal Serial Bus Type-C Cable and Connector Specification", Retrieved From: https://www.usb.org/sites/default/files/USB%20Type-C%20Spec%20R2.0%20-%20August%202019.pdf, Aug. 2019, pp. 1-373.

Gopalakrishnan, et al., "Circuit Protection for USB Type-C", Retrieved From: https://www.ti.com.cn/cn/lit/wp/slyy105/slyy105.pdf, Oct. 2016, pp. 1-12.

"International Search Report and Written Opinion Issued in PCT Application No. PCT/CN21/071189", Mailed Date: Sep. 28, 2021, 7 Pages.

Communication pursuant to Rules 70(2) and 70a(2) EPC received in European Application No. 21918164.1, mailed on Oct. 18, 2024, 01 pages.

Extended European search report received in European Application No. 21918164.1, mailed on Oct. 1, 2024, 05 pages.

Office Action Received for Chinese Application No. 202180019626.5, mailed on Sep. 6, 2024, 13 pages (English Translation Provided).

International Search report and written opinion received for PCT Application No. PCT/CN2014/071189, mailed on Sep. 29, 2014, 13 pages.

Second Office Action Received for Chinese Application No. 202180019626.5, mailed on Feb. 26, 2025, 12 pages (English Translation Provided).

Notice of Allowance Received for Chinese Application No. 202180019626.5, mailed on Jun. 30, 2025, 05 pages (English Translation Provided).

\* cited by examiner

PIN-SHORT DAMAGE PROTECTION

CROSS-REFERENCE TO RELATED APPLICATIONS

The present application is a U.S. national stage entry of PCT Application No. PCT/CN2021/071189, entitled "PIN-SHORT DAMAGE PROTECTION," and filed on Jan. 12, 2021, which is incorporated by reference herein for all that it discloses or teaches.

BACKGROUND

Some system connection technologies are configured to deliver power from a power delivery source (e.g., a power adapter) to a power delivery sink (e.g., a mobile computing device). For example, USB Type-C (USB-C) is a universal serial bus (USB) standard that combines support for data, video, and power delivery into a single, flexible connector system. The USB-C connector supports USB power delivery with capabilities extending up to 100 W, allowing the power delivery source to dynamically manage a current from 0.5 A to 5.0 A. A voltage bus (VBUS) can supply a voltage up to 20 V, allowing connected a power delivery sink (e.g., a mobile phone) to be charged rapidly.

SUMMARY

The described technology provides an electrical cable for protecting against pin-short damage at a connector port. The electrical cable includes one or more sensors positioned within the connector outer body that are configured to monitor a state of the connection interface of the electrical cable. The connection interface is configured to attach to and deliver power via the connector power between a power delivery source and a power delivery sink port. A power control signal controller is configured to predict a disconnection event between the connection interface of the electrical cable and the connector port based on the monitored state of the connection interface and to trigger a reduction in voltage and/or power supplied to a voltage bus of the electrical cable by the power delivery source, based at least in part on prediction of the disconnection event.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
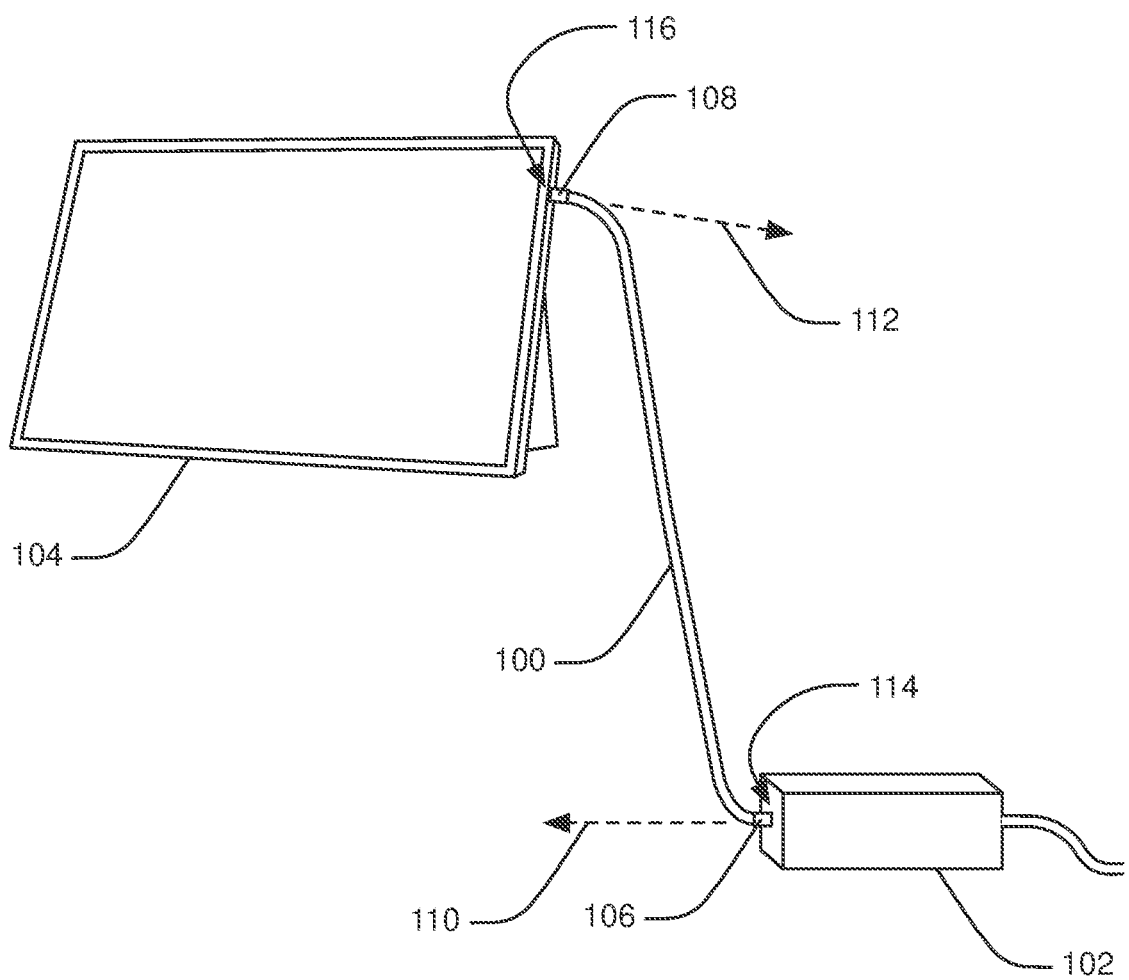
FIG. 1 illustrates an example electrical cable connecting a power delivery source to a power delivery sink.

The symmetrical definition of the USB-C connector enables a reversible plug orientation. In a small form factor, the 24-pin, double-sided connector has a 0.5 mm pin-to-pin pitch, which increases the risk of a pin-to-pin electrical short. For example, such a short could result from a mechanical twisting force applied at the connection interface between the USB-C connectors of the power delivery source and the power delivery sink, e.g., a USB-C connector plug (the male end) is rotated in a USB-C connector receptacle (the female end) at the connection interface, a USB-C connector is pulled out of a USB-C receptacle at an angle. In addition, a build-up of small debris and moisture due to connector aging can also cause and/or contribute to a short. It should be understood that other system connection technologies (i.e., other than USB-C connectors) can suffer from a similar risk of damage from pin-in-pin shorts at the connection interface between connectors of a power delivery source and a power delivery sink.

Using the USB-C standard as an example, connectors include multiple pins that electrically contact each other when the connectors are attached at a connection interface. For USB-C, example pins include ground pins (GND), fast transmit pins (e.g., TX1+, TX1−, TX2+, TX2−), fast receive pins (e.g., RX1+, RX1−, RX2+, RX2−), USB 2.0-compatible data communication pins (D+, D−), power delivery pins (VBUS/CONN), sideband channel pins (SBU1, SBU2), and configuration channel pins (CC1, CC2). The CC and SBU pins are directly adjacent to the VBUS pins, so a short between the CC/SBU pins and the VB US pins can expose a high voltage (e.g., 20V) to the downstream circuitry of the power delivery sink, potentially causing damage to the system. The connector and cable for the power delivery source can also provide enough inductance in the resistor-inductor-capacitor (RLC) circuit of the device and cable to generate a peak voltage during ringing of about double that (e.g., up to $44V_{p\text{-}p}$) of the settling or final voltage. As such, the Upstream Facing Port's (UFP's) internal circuitry can be damaged during a "short-to-VBUS event" on USB-C pins at a connection interface.

The described technology protects an electronic device from many pin-short damage scenarios by adding sensors to a connector cable, which trigger a signal to turn the power to the device off or down before a short event occurs. In one implementation, the connection interface of the connector cable is equipped with one or more sensors to detect an impending disconnect event, which can cause a pin-short. For example, the sensors can detect the proximity of a user's fingers and predict that the user is going to disconnect the cable from the device. In such cases, the detected event can represent the risk of a potential pin-short, and the cable or the device can trigger a power down (e.g., power off or power decrease) action at the power delivery source to protect the power delivery sink from possible pin-short damage. In one implementation, this power down action can be temporary, using a timer to restore full power after a brief period (e.g., when the user touches the connector connection interface to ensure that the connector is secure, the power may drop temporary and then return if the connector is not disconnected).

The pin-short damage protection is primarily described herein as it relates to reducing and restoring voltage to a voltage bus. It should be understood, however, that pin-short damage protection may also be described with reference to a reduction of power, which implicates voltage and current. For example, limiting current on the voltage bus can also provide pin-short damage protection.

FIG. 1 illustrates an example electrical cable 100 connecting a power delivery source 102 (e.g., a power adapter) to a power delivery sink 104 (e.g., a mobile computer). The electrical cable 100 includes two connection interfaces 106 and 108, one at each end of the electrical cable 100. Each connection interface is configured to attach to and deliver power via a connector port between a power delivery source and a power delivery sink (the power delivery source 102 includes a connector port 114 and the power delivery sink 104 includes a connector port 116). In the illustration of FIG. 1, both connection interfaces include male connectors or plugs, although, in other implementations, one or both of the connection interfaces could include female connectors or receptacles or electrical connectors having some other type of connector configuration. In one implementation, the electrical cable 100 conforms to the USE Type-C (USB-C) standard that combines data, video, and power delivery into a single, flexible connector system.

A USB-C standard defines a small form factor configuration with a 24-pin double-sided connector having a 0.5 mm pin-to-pin pitch, which increases risks for a pin short, such as between the CC and VBUS pins or the SBU and VBUS pins, although other pin shorts are contemplated. Such shorts are more likely when the connection interface of the electrical cable 100 is disconnected from a connection interface of the power delivery sink 104 or the power delivery source 102. When a user grasps the outer connector body of the connection interface 106 or 108 to withdraw the electrical cable from a connector port (as illustrated by the dashed arrows 110 and 112), the connection interface 106 or 108 of the electrical cable 100 tends to rotate or misalign in the corresponding connector port. As such, a disconnection event presents an enhanced risk of a pin-short at the connection interfaces of the ports. In some implementations, a connection event (e.g., plugging the USB-C plug into a USB-C port) may also pose a risk of a pin-short. Accordingly, the described technology may be used to reduce voltage or power in anticipation of a connection event as well.

The electrical cable 100 includes pin-short damage protection on one or both of its ends. In one implementation, the connection interface (e.g., connection interface 108) includes one or more sensors and a power control signal controller. The one or more sensors are positioned within a connector outer body of the connection interface 108 of the electrical cable 100. The sensors can be embedded in the connector outer body itself or encompassed, enclosed, or otherwise be positioned at least partially within the volume of the connector outer body. When attempting to detach the electrical cable 100 from the power delivery sink 104, a user would typically grasp the connector outer body of the connection interface 108 and pull the connection interface 108 from the connector port of the power delivery sink 104 (a disconnection event).

The one or more sensors in the connection interface 108 monitor the state of the connection interface 108 to predict a disconnection event before a pin-short has occurred. For example, as the user grasps the connector outer body of the connection interface 108, the one or more sensors detect a state of proximity, contact, or presence of the user's fingers to the connection interface 108. This state suggests that the user may detach the electrical cable 100 from the connector port of the power delivery sink 104. Accordingly, the one or more sensors send one or more signals to the power control signal controller in the connection interface 108, which interprets the signals to predict whether a disconnection event is to be expected. It should be understood that the power control signal controller may determine that signals predict a likely disconnection event while others do not (e.g., a very brief and weak proximity detection signal may simply suggest that a conductive body is near the connection interface 108 without suggests that the user has grasped it).

Example sensors in the connection interface 108 may include proximity sensors, contact sensors, mechanical sensors, force sensors, and other sensors that can detect a state predictive of an anticipated disconnection event. For example, the power control signal controller may evaluate signals from a proximity sensor to determine whether the detected disconnection object(s) (e.g., a person's fingers) are within a predefined proximity distance from the connector outer body for at least a predefined period of time. Contact and mechanical sensors can detect whether the detected disconnection object(s) contact the connector outer body or grip it with a predefined force, respectively. In yet another example, force sensors may be positioned in the connection interface (e.g., within the connector outer body and/or in or near the plug or receptacle structures of the connection interface) to detect a possible disconnection event that occurs when a user does not grip the connector outer body (e.g., when a user trips on the electrical cable and yanks out it out of a connector port of a computing device). In yet another implementation, one or more accelerometers or gyros may be employed to detect sudden movement, which can be predictive of a possible disconnection event. These different sensors can also be used in various combinations. Voltage restoration to the voltage bus may be dependent on a change in the state of the connection interface (e.g., fingers removed, reduction in movement), a timer measuring the time since the first state changed, etc.

Based on the state characterized by the sensor signals, the power control signal controller predicts whether a disconnection event is anticipated between the connection interface of the electrical cable and the connector port based on the monitored state of the connection interface. The power control signal controller triggers a reduction in voltage and/or power supplied to a voltage bus of the electrical cable 100 by the power delivery source 102, based at least in part on predicting the disconnection event. In one implementation, the power control signal controller toggles a switch to electrically connect the VBUS of the electrical cable 100 to the configuration channel (CC) through a voltage regulator and the switch. This action generates a power control signal by pulling the voltage of CC high enough to signal the power delivery source 102 to reduce the voltage and/or power to the VBUS of the electrical cable 100, even in the absence of a pin-short, according to the USB-C standard. The use of a high voltage on CC is an example power control signal, and alternatively, other power control signals may be employed. Accordingly, by predicting a possible disconnection event by monitoring the state of the connection interface of the cable, the power to the VBUS can be reduced (e.g., turned off) before the occurrence of a pin-short.

After the voltage on the voltage bus of the electrical cable 100 has been reduced, the predicted disconnection event may not occur. For example, the user may have gripped the connection interface 106 to confirm that it is seated securely in the connector port 114 of the power delivery source 102. This action may be interpreted by the sensors and power control signal controller as a possible disconnection event, and the voltage on the voltage bus is temporarily reduced. Nevertheless, if the user releases his or her grip on the connection interface 106, the power delivery system can restore the voltage to the voltage bus. Accordingly, while the sensors and the power control signal controller continue to monitor the state of the connection interface, they can determine that the disconnection event is no longer predicted, because the state of the connection interface 106 has changed to indicate that the user is no longer gripping the connection interface 106. In response to this determination, the power control signal controller can trigger a power control signal to cause the power delivery source 102 to restore the voltage applied to the voltage bus, based at least in part on determination that the disconnection event is no longer predicted.

Figure 2:
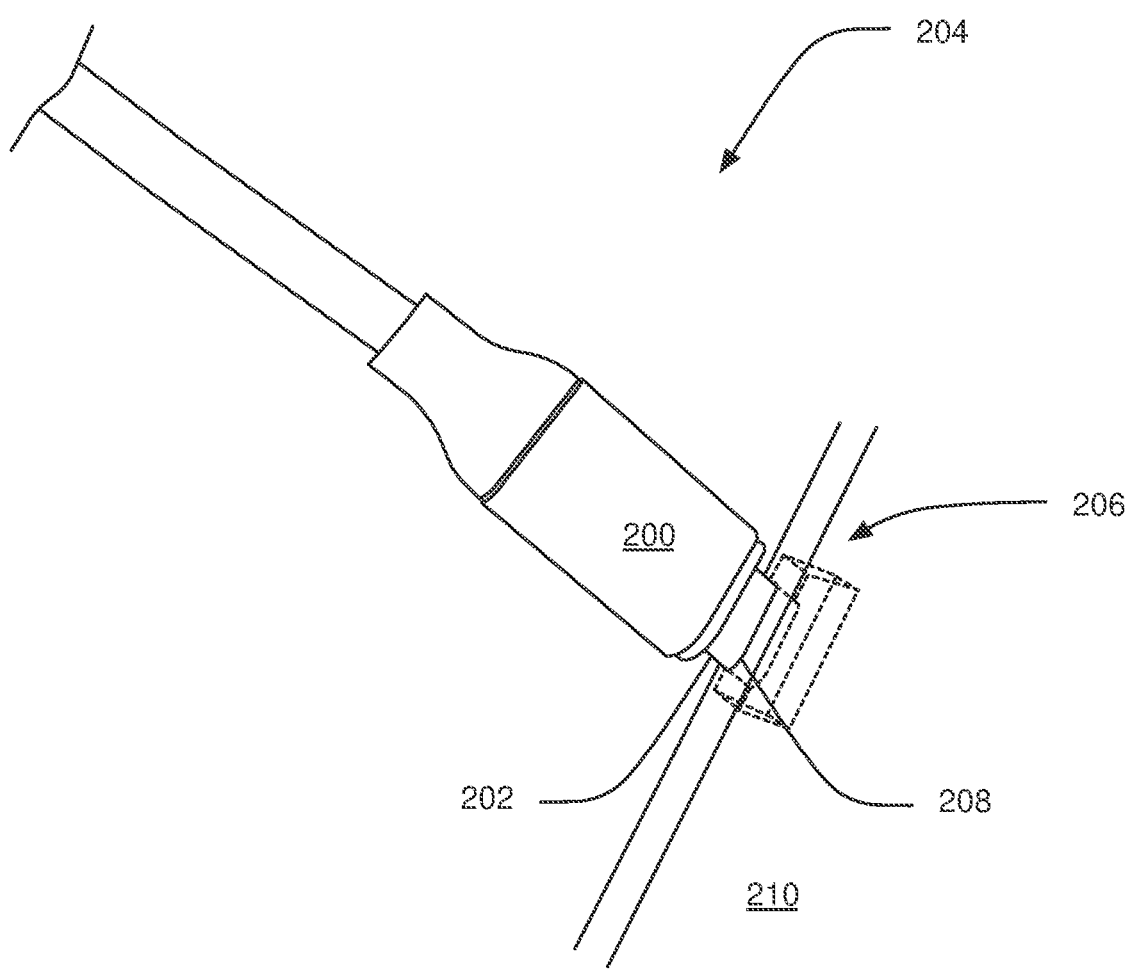
FIG. 2 illustrates an example connection interface of a connector plug of an electrical cable and a connection interface of a connector receptacle in a power delivery sink.

FIG. 2 illustrates an example connection interface 200 of a connector plug 202 of an electrical cable 204 and a connection interface 206 of a connector receptacle 208 in a power delivery sink 210. The example connection interface 200 includes pin-short damage protection circuitry to protect the electronics in the power delivery sink 210. In various implementations, the connection interface 200 of the electrical cable 204 includes one or more sensors to monitor the state of the connection interface 200. Example sensors in the connection interface 200 may include proximity sensors, contact sensors, mechanical sensors, force sensors, and other sensors that can detect a state predictive of an anticipated disconnection event.

A power control signal controller in the connection interface 200 receives signals from the sensors and determines whether the signals indicate a state that suggests that a disconnection event is about to occur (e.g., a user gripping the connection interface 200, an excessive force on the connector plug 202). If the power control signal controller predicts that a disconnection event is about to occur, the power control signal controller triggers a reduction in voltage and/or power supplied to a voltage bus of the electrical cable 204 by a power delivery source. In one implementation, the power control signal controller sends a power control signal to be sent to the power delivery source to cause a reduction (e.g., shut down) of voltage and/or power supplied to the voltage bus of the electrical cable 204. If the state changes to one that does not suggest that a disconnection event is about to occur (e.g., the user releases his or her grip on the connection interface 200, the excessive force on the connector plug 202 dissipates), the power control signal controller can change the power control signal to cause the power delivery source to restore voltage to the voltage bus of the electrical cable 204.

Figure 3:
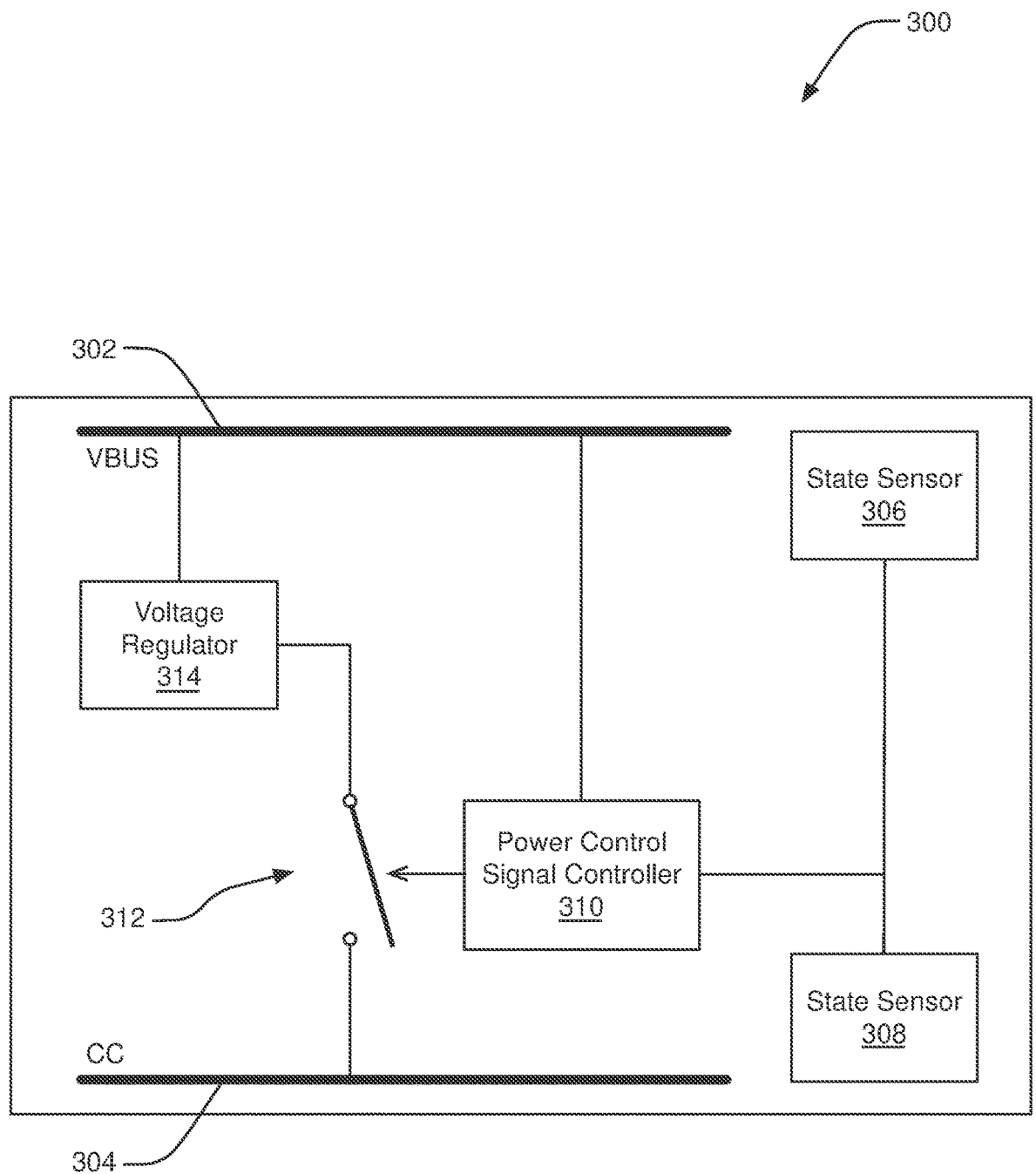
FIG. 3 illustrates an example pin-short damage protection circuit in an electrical cable.

FIG. 3 illustrates an example pin-short damage protection circuit 300 in an electrical cable. A voltage bus 302 (e.g., VBUS) and a configuration channel (CC) bus 304 run the length of the electrical cable substantially, terminating at the connection interfaces of the electrical cable. When connecting an electrical cable to a power delivery sink, according to the USB-C standard, the voltage bus 302 from a connected power delivery source provides about 0 to 5 volts and limited current. After the connection, the power delivery source increases the voltage on the voltage bus 302 to provide 20 volts and a charging current up to 5 amps. During a disconnection event, the high voltage on the voltage bus 302 can cause damage to the internal circuitry of the power delivery sink if another pin shorts to the voltage bus 302. Accordingly, in one implementation, the pin-short damage protection circuit 300 senses a state predictive of a possible disconnection event and reduces the voltage to voltage bus 302 before a short can occur. It should be understood that different power delivery sources, power deliver sinks, and power delivery standards may involve different voltage and current levels than described here in various states of operation.

One or more event sensors are included in the pin-short protection circuitry 300. In FIG. 3, an event sensor 306 and an event sensor 308 may be positioned on opposite sides of the connection interface of the electrical cable to monitor the state of the connection interface and to detect proximity, contact, force, and/or other evidence of the presence of a user's index finger and thumb, which may be predictive of a disconnection event. Other configurations with only one sensor or more than two sensors and/or sensors in different positions may be employed. For example, in one implementation, the event sensors are in the form of force sensors in the connection interface that can detect excessive force on the plug or receptacle, which could be suggestive of an impending disconnection.

Signals from the event sensors are communicated to a power control signal controller 310, which evaluates the signals to determine if the state of the connection interface is predictive of an impending disconnection. If a disconnection event is predicted by the power control signal controller 310, it closes a switch 312 to increase the voltage on the configuration channel bus 304. The switch 312 could be in the form of a mechanical switch, an electrical switch, a magnetic switch, a transistor, or another form of signal switching component. The increased voltage is supplied from the voltage bus 302 through a voltage regulator 314 (e.g., providing a 3.3-volt output to the configuration channel bus 304). The increased voltage on the configuration channel bus 304 acts as a power control signal to the connected power delivery source to reduce the voltage and/or power on the voltage bus 302 of the electrical cable. If the event sensors detect a state that is no longer predictive of an impending disconnection event, the power control signal controller 310 can open the switch 312 and reduce voltage on the configuration channel bus 304, which will cause the power delivery source to restore the voltage to the voltage bus 302 of the electrical cable.

Other circuitry configurations may be employed to generate the power control signal that triggers the reduction and restoration of voltage to the voltage bus 302. For example, the voltage to the voltage regulator 314 is shown in FIG. 3 as being supplied by the voltage bus 302 (e.g., VBUS); however, in alternative implementations, another voltage source may be used (e.g., Vconn). The circuitry elements may include standard or special-purpose electrical, magnetic, and/or mechanical components.

In an alternative implementation and in response to a sensor signal, the controller can send BMC (biphase mark coding) codes or other signals to the power delivery source over the configuration channel or another channel or bus to trigger a modification of voltage supplied to the voltage bus. Other power control signaling configurations may also be employed.

Figure 4:
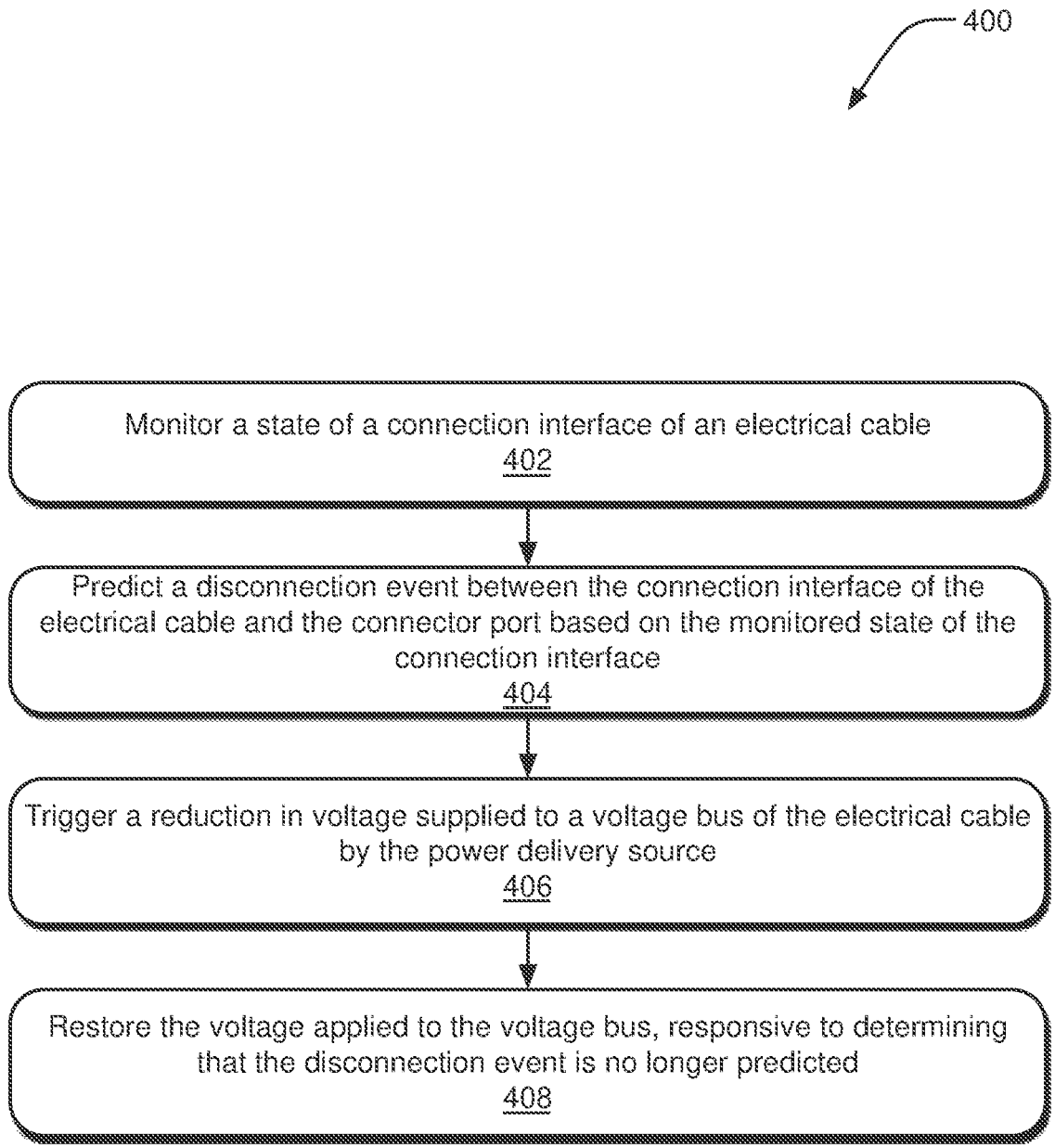
FIG. 4 illustrates example operations for protecting a device from pin-short damage.

FIG. 4 illustrates example operations 400 for protecting a device from pin-short damage. A monitoring operation 402 monitors a state of a connection interface of an electrical cable. The connection interface is configured to connect to and deliver power via the connector port between a power delivery source and a power delivery sink. For example, the connection interface can be connected to either the power delivery sink or the power delivery source. A prediction operation 404 predicts a disconnection event between the connection interface of the electrical cable and the connector port based on the monitored state of the connection interface, although the predicted disconnection event may never actually occur (e.g., the user removes his or her fingers from the connection interface without disconnecting it from the connection port).

A triggering operation 406 triggers a reduction in voltage and/or power supplied to a voltage bus of the electrical cable by the power delivery source, based at least in part on predicting the disconnection event. For example, a power control signal is sent to the power delivery source to reduce the voltage supplied by the source to the voltage bus. In one implementation (e.g., in USB-C), the power control signal is in the form of an increased voltage applied to the configuration channel bus of the electrical cable, although other signals may be employed. If the disconnection event does not occur (e.g., the monitoring no longer a state predictive of a disconnection event, such when a user releases the connection interface without pulling it out of the connection port), then a restoring operation 408 restores the voltage applied to the voltage bus, based at least in part on determining that the disconnection event is no longer predicted.

The timing of these operations can be determined to most likely result in a reduction in voltage and/or power of the bus voltage before a pin-short is experienced from a disconnection event. Referring to the USB-C implementation, as an example, the time period between a user's fingers contacting a connection interface to the actual disconnection of the connection interface from the connector port is approximately greater than 500 ms. The timing of the described pin-short protection scheme can reduce the voltage on the voltage bus before the risk of a pin-short is significant, as shown by the example timings below:

1) Finger sensor detection and pulling the configuration channel up to 3.3 V=~1 ms
2) Power delivery source receives the power control signal and starts to power down the voltage bus=~25 ms
3) Voltage on the voltage bus at the connection interface goes down from 20 volts to zero volts=~250 ms In this example, the voltage on the voltage bus is reduced to zero volts in about 276 ms, which is likely to be fast enough to prevent pin-short damage from a disconnection event, which takes about 500 ms to begin after a user touches the connection interface.

When a user's fingers are removed from the connection interface, the voltage can be restored within about 200 ms after detection of the removal. The power control signal controller opens the switch, which pulls the configuration channel bus low from its previous 3.3 volt level (or releases the configuration channel bus from the 3.3 volt level) and triggers the power delivery source to restore the voltage bus to its 20 volt operational level.

An example method of protecting against pin-short damage, at a connector port includes monitoring a state of a connection interface of an electrical cable, the connection interface being configured to connect to and deliver power via the connector port between a power delivery source and a power delivery sink, predicting a disconnection event between the connection interface of the electrical cable and the connector port based on the monitored state of the connection interface, and triggering a reduction in voltage and/or power supplied to a voltage bus of the electrical cable by the power delivery source, based at least in part on predicting the disconnection event.

Another example, method of any previous method is provided, wherein the connection interface includes a connector outer body and the monitoring operation includes detecting a presence of at least one disconnection object at the connector outer body as the monitored state of the connection interface.

Another example method of any previous method is provided, wherein the detecting operation includes detecting, via a touch sensor, the at least one disconnection object contacting the connector outer body as the monitored state of the connection interface.

Another example method of any previous method is provided, wherein the detecting operation includes detecting, via a proximity sensor, the at least one disconnection object in a predefined proximity distance from the connector outer body as the monitored state of the connection interface.

Another example method of any previous method is provided, wherein the detecting operation includes detecting, via a mechanical sensor, the at least one disconnection object contacting the connector outer body with a predefined force as the monitored state of the connection interface.

Another example method of any previous method is provided, further including monitoring the state of the connection interface, based at least in part on the triggering operation, determining that the disconnection event is no longer predicted based on the monitored state of the connection interface, and restoring the voltage applied to the voltage bus, based at least in part on determining that the disconnection event is no longer predicted.

Another example method of any previous method is provided, wherein the generating operation includes raising voltage on a configuration channel bus of the electrical cable as a power control signal triggering the power delivery source to reduce the voltage supplied to the voltage bus of the electrical cable, based at least in part on predicting the disconnection event.

An example system for protecting against pin-short damage at a connector port includes means for monitoring a state of a connection interface of an electrical cable, the connection interface being configured to connect to and deliver power via the connector port between a power delivery source and a power delivery sink, means for predicting a disconnection event between the connection interface of the electrical cable and the connector port based on the monitored state of the connection interface, and means for triggering a reduction in voltage supplied to a voltage bus of the electrical cable by the power delivery source, based at least in part on predicting the disconnection event.

Another example system of any previous system is provided, wherein the connection interface includes a connector outer body and the means for monitoring includes means for detecting a presence of at least one disconnection object at the connector outer body as the monitored state of the connection interface.

Another example system of any previous system is provided, wherein the means for detecting includes detecting, via a touch sensor, the at least one disconnection object contacting the connector outer body as the monitored state of the connection interface.

Another example system of any previous system is provided, wherein the means for detecting includes detecting, via a proximity sensor, the at least one disconnection object in a predefined proximity distance from the connector outer body as the monitored state of the connection interface.

Another example system of any previous system is provided, wherein the means for detecting includes detecting, via a mechanical sensor, the at least one disconnection object contacting the connector outer body with a predefined force as the monitored state of the connection interface.

Another example system of any previous system is provided, wherein the means for monitoring the state of the connection interface is responsive at least in part on the means for triggering, and further including means for determining that the disconnection event is no longer predicted based on the monitored state of the connection interface, and means for restoring the voltage applied to the voltage bus, based at least in part on determining that the disconnection event is no longer predicted.

Another example system of any previous system is provided, wherein the means for generating includes raising voltage on a configuration channel bus of the electrical cable as a power control signal triggering the power delivery source to reduce the voltage supplied to the voltage bus of the electrical cable, based at least in part on predicting the disconnection event.

An example system for protecting against pin-short damage at a connector port is provided, wherein the system includes one or more sensors configured to monitor a state of a connection interface of an electrical cable, the connection interface being configured to connect to and deliver power via the connector power between a power delivery source and a power delivery sink port, and a power control signal controller configured to predict a disconnection event between the connection interface of the electrical cable and the connector port based on the monitored state of the connection interface and to trigger a reduction in voltage supplied to a voltage bus of the electrical cable by the power delivery source, based at least in part on prediction of the disconnection event.

Another example system of any previous system is provided, wherein the connection interface includes a connector outer body, and the one or more sensors are positioned within the connector outer body and are configured to detect a presence of at least one disconnection object at the connector outer body as the monitored state of the connection interface.

Another example system of any previous system is provided, wherein the one or more sensors include a touch sensor and are configured to detect the at least one disconnection object contacting the connector outer body as the monitored state of the connection interface.

Another example system of any previous system is provided, wherein the one or more sensors include a proximity sensor and are configured to detect the at least one disconnection object in a predefined proximity distance from the connector outer body as the monitored state of the connection interface.

Another example system of any previous system is provided, wherein the one or more sensors include a mechanical sensor and are configured to detect the at least one disconnection object contacting the connector outer body as the monitored state of the connection interface.

Another example system of any previous system is provided, wherein the power control signal controller is further configured to monitor the state of the connection interface, based at least in part on reduction in voltage supplied to the voltage bus, to determine that the disconnection event is no longer predicted based on the monitored state of the connection interface, and to restore the voltage applied to the voltage bus, based at least in part on determination that the disconnection event is no longer predicted.

Another example system of any previous system is provided, wherein the power control signal controller is further configured to raise voltage on a configuration channel bus of the electrical cable as a power control signal triggering the power delivery source to reduce the voltage supplied to the voltage bus of the electrical cable, based at least in part on prediction of the disconnection event.

An example electrical cable for protecting against pin-short damage at a connector port is provided. The electrical cable includes a connector outer body in a connection interface at an end of the electrical cable, one or more sensors positioned within the connector outer body and configured to monitor a state of the connection interface of the electrical cable, the connection interface being configured to connect to and deliver power via the connector power between a power delivery source and a power delivery sink port, and a power control signal controller configured to predict a disconnection event between the connection interface of the electrical cable and the connector port based on the monitored state of the connection interface and to trigger a reduction in power supplied to a voltage bus of the electrical cable by the power delivery source, based at least in part on prediction of the disconnection event.

Another electrical cable of any previous electrical cable is provided, wherein the one or more sensors are configured to detect a presence of at least one disconnection object at the connector outer body as the monitored state of the connection interface.

Another electrical cable of any previous electrical cable is provided, wherein the one or more sensors include a touch sensor and are configured to detect the at least one disconnection object contacting the connector outer body as the monitored state of the connection interface.

Another electrical cable of any previous electrical cable is provided, wherein the one or more sensors include a proximity sensor and are configured to detect the at least one disconnection object in a predefined proximity distance from the connector outer body as the monitored state of the connection interface.

Another electrical cable of any previous electrical cable is provided, wherein the power control signal controller is further configured to monitor the state of the connection interface, based at least in part on reduction in power supplied to the voltage bus, to determine that the disconnection event is no longer predicted based on the monitored state of the connection interface, and to restore the power applied to the voltage bus, based at least in part on determination that the disconnection event is no longer predicted.

Another electrical cable of any previous electrical cable is provided, wherein the power control signal controller is further configured to raise voltage on a configuration channel bus of the electrical cable as a power control signal triggering the power delivery source to reduce the power supplied to the voltage bus of the electrical cable, based at least in part on prediction of the disconnection event.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of protecting against pin-short damage at a connector port, the method comprising:
monitoring a state of a connection interface of an electrical cable, the connection interface including a connector outer body and being configured to connect to and deliver power via the connector port between a power delivery source and a power delivery sink;
predicting a disconnection event between the connection interface of the electrical cable and the connector port based on the monitored state of the connection interface, based at least in part on detecting a presence of at least one disconnection object at the connector outer body as the monitored state of the connection interface, wherein the at least one disconnection object is capable of physically disconnecting the electrical cable from the connector port; and
triggering a reduction in voltage supplied to a voltage bus of the electrical cable by the power delivery source, based at least in part on predicting the disconnection event.

2. The method of claim 1, wherein the detecting operation comprises:
detecting, via a touch sensor, the at least one disconnection object contacting the connector outer body as the monitored state of the connection interface.

3. The method of claim 1, wherein the detecting operation comprises:
detecting, via a proximity sensor, the at least one disconnection object in a predefined proximity distance from the connector outer body as the monitored state of the connection interface.

4. The method of claim 1, wherein the detecting operation comprises:
detecting, via a mechanical sensor, the at least one disconnection object contacting the connector outer body with a predefined force as the monitored state of the connection interface.

5. The method of claim 1, further comprising:
monitoring the state of the connection interface, based at least in part on the triggering operation;
determining that the disconnection event is no longer predicted based on the monitored state of the connection interface; and
restoring the voltage applied to the voltage bus, based at least in part on determining that the disconnection event is no longer predicted.

6. The method of claim 1 wherein the generating operation comprises:
raising voltage on a configuration channel bus of the electrical cable as a power control signal triggering the power delivery source to reduce the voltage supplied to the voltage bus of the electrical cable, based at least in part on predicting the disconnection event.

7. A system for protecting against pin-short damage at a connector port, the system comprising:
one or more sensors configured to monitor a state of a connection interface of an electrical cable, the connection interface including a connector outer body and being configured to connect to and deliver power via the connector port between a power delivery source and a power delivery sink port; and
a power control signal controller configured to predict a disconnection event between the connection interface of the electrical cable and the connector port based on the monitored state of the connection interface based at least in part on detecting a presence of at least one disconnection object at the connector outer body as the monitored state of the connection interface, wherein the at least one disconnection object is capable of physically disconnecting the electrical cable from the connector port, and wherein the power control signal controller is further configured to trigger a reduction in voltage supplied to a voltage bus of the electrical cable by the power delivery source, based at least in part on prediction of the disconnection event.

8. The system of claim 7, wherein the one or more sensors include a touch sensor and are configured to detect the at least one disconnection object contacting the connector outer body as the monitored state of the connection interface.

9. The system of claim 7, wherein the one or more sensors include a proximity sensor and are configured to detect the at least one disconnection object in a predefined proximity distance from the connector outer body as the monitored state of the connection interface.

10. The system of claim 7, wherein the one or more sensors include a mechanical sensor and are configured to detect the at least one disconnection object contacting the connector outer body as the monitored state of the connection interface.

11. The system of claim 7, wherein the power control signal controller is further configured to monitor the state of the connection interface, based at least in part on reduction in voltage supplied to the voltage bus, to determine that the disconnection event is no longer predicted based on the monitored state of the connection interface, and to restore the voltage applied to the voltage bus, based at least in part on determination that the disconnection event is no longer predicted.

12. The system of claim 7 wherein the power control signal controller is further configured to raise voltage on a configuration channel bus of the electrical cable as a power control signal triggering the power delivery source to reduce the voltage supplied to the voltage bus of the electrical cable, based at least in part on prediction of the disconnection event.

13. An electrical cable for protecting against pin-short damage at a connector port, the electrical cable comprising:
a connector outer body in a connection interface at an end of the electrical cable;
one or more sensors positioned within the connector outer body and configured to monitor a state of the connection interface of the electrical cable, the connection interface being configured to connect to and deliver power via the connector port between a power delivery source and a power delivery sink port; and a power control signal controller configured to predict a disconnection event between the connection interface of the electrical cable and the connector port based on the monitored state of the connection interface based at least in part on detecting a presence of at least one disconnection object at the connector outer body as the monitored state of the connection interface, wherein the at least one disconnection object is capable of physically disconnecting the electrical cable from the connector port, and wherein the power control signal controller is further configured to trigger a reduction in power supplied to a voltage bus of the electrical cable by the power delivery source, based at least in part on prediction of the disconnection event.

14. The electrical cable of claim 13, wherein the one or more sensors include a touch sensor and are configured to detect the at least one disconnection object contacting the connector outer body as the monitored state of the connection interface.

15. The electrical cable of claim 13, wherein the one or more sensors include a proximity sensor and are configured to detect the at least one disconnection object in a predefined proximity distance from the connector outer body as the monitored state of the connection interface.

16. The electrical cable of claim 13, wherein the power control signal controller is further configured to monitor the state of the connection interface, based at least in part on reduction in power supplied to the voltage bus, to determine that the disconnection event is no longer predicted based on the monitored state of the connection interface, and to restore the power applied to the voltage bus, based at least in part on determination that the disconnection event is no longer predicted.

17. The electrical cable of claim 13 wherein the power control signal controller is further configured to raise voltage on a configuration channel bus of the electrical cable as a power control signal triggering the power delivery source to reduce the power supplied to the voltage bus of the electrical cable, based at least in part on prediction of the disconnection event.

* * * * *